US008908232B2

(12) United States Patent
Aikawa et al.

(10) Patent No.: US 8,908,232 B2
(45) Date of Patent: Dec. 9, 2014

(54) IMAGE INSPECTION SYSTEM AND IMAGE INSPECTION APPARATUS

(71) Applicant: Fuji Xerox Co., Ltd., Tokyo (JP)

(72) Inventors: Kiyofumi Aikawa, Kanagawa (JP); Michio Kikuchi, Kanagawa (JP); Takashi Hiramatsu, Kanagawa (JP); Kazuya Fukunaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/972,180

(22) Filed: Aug. 21, 2013

(65) Prior Publication Data
US 2014/0285852 A1    Sep. 25, 2014

(30) Foreign Application Priority Data

Mar. 22, 2013  (JP) ................................. 2013-061023

(51) Int. Cl.
| | | |
|---|---|---|
| H04N 1/40 | (2006.01) | |
| G06K 15/00 | (2006.01) | |
| G06F 3/12 | (2006.01) | |
| G03G 15/00 | (2006.01) | |
| G06K 9/00 | (2006.01) | |
| B41J 29/393 | (2006.01) | |
| G06K 15/02 | (2006.01) | |

(52) U.S. Cl.
CPC ................... *G06K 15/1872* (2013.01)
USPC .......... 358/3.24; 358/1.13; 358/1.14; 399/14; 382/112; 347/19

(58) Field of Classification Search
CPC ................... G01N 21/8851; G01N 2021/8861; G01N 21/956; G06T 7/0004; G06T 2207/30144; G06T 7/0002; G06T 2207/30108
USPC ................... 358/3.24, 1.13, 1.14; 399/14, 19; 382/145, 112; 348/135, 136; 347/19
See application file for complete search history.

(56) References Cited

U.S. PATENT DOCUMENTS

| 8,433,209 B2 * | 4/2013 | Ito .................................. 399/15 |
| 8,585,174 B2 * | 11/2013 | Saita .............................. 347/19 |
| 8,681,217 B2 * | 3/2014 | Hori .............................. 348/136 |
| 2006/0115127 A1 * | 6/2006 | Hatayama ..................... 382/112 |

(Continued)

FOREIGN PATENT DOCUMENTS

| AU | 2008264171 A1 | 7/2010 |
| JP | A-8-145910 | 6/1996 |

(Continued)

OTHER PUBLICATIONS

European Search Report dated Jul. 11, 2014 issued in European Patent Application No. 13182314.8.

*Primary Examiner* — Charlotte M Baker
(74) *Attorney, Agent, or Firm* — Oliff PLC

(57) ABSTRACT

When defects occur in four places of a print data region of a paper P1 as illustrated in FIG. 3A, four code images are formed on an interleaving paper P2 as illustrated in FIG. 3B, more specifically, four code images are formed on the interleaving paper P2 such that the positions of plural defect occurrence portions in the paper P1 are aligned with the positions of plural code images formed in the interleaving paper P2, respectively, and the sizes of the code images are made to be different depending on the defective degree of the defects occurring at the defect occurrence portions of the paper P1, specifically, the larger the defective degree is, the larger the code image is.

9 Claims, 9 Drawing Sheets

(56) References Cited

U.S. PATENT DOCUMENTS

| | | |
|---|---|---|
| 2007/0256586 A1 | 11/2007 | Bonikowski et al. |
| 2009/0304259 A1* | 12/2009 | Yamamoto .................... 382/145 |
| 2011/0299862 A1* | 12/2011 | Kozuka ......................... 399/19 |
| 2012/0070040 A1* | 3/2012 | Vans et al. .................... 382/112 |

FOREIGN PATENT DOCUMENTS

| | | |
|---|---|---|
| JP | A-9-94939 | 4/1997 |
| JP | A-2002-312767 | 10/2002 |
| JP | A-2005-074762 | 3/2005 |
| JP | A-2005-205747 | 8/2005 |

* cited by examiner

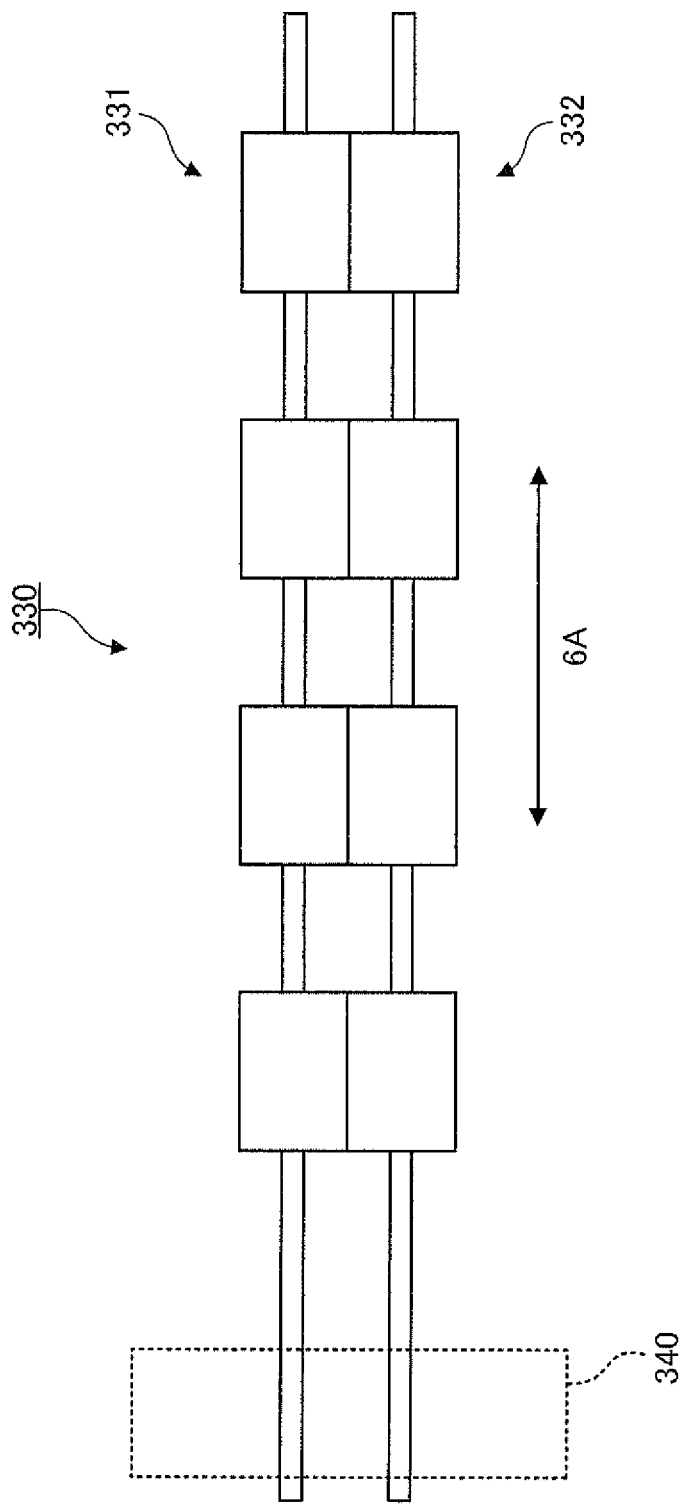

INTERLEAVING PAPER

PAPER HAVING DEFECT BEING DETECTED

IMAGE INSPECTION SYSTEM AND IMAGE INSPECTION APPARATUS

CROSS-REFERENCE TO RELATED APPLICATIONS

This application is based on and claims priority under 35 U.S.C. 119 from Japanese Patent Application No. 2013-061023 filed on Mar. 22, 2013.

BACKGROUND

Technical Field

The present invention relates to an image inspection system and an image inspection apparatus.

SUMMARY

According to an aspect of the invention, an image inspection system, includes: a first image forming unit that forms an image on a recording material; an inspection unit that inspects a formed image formed on the recording material by the first image forming unit and specifies from the formed image, a portion which does not satisfy a predetermined requirement; a stacking unit that stacks the recording material subjected to the inspection by the inspection unit and stacks a sheet together with the recording material, the recording material and the sheet being also stacked such that the recording material on which the formed image having the portion which does not satisfy the predetermined requirement and the sheet contact with each other; and a second image forming unit that forms an image on the sheet, in which the forming of the image onto the sheet is performed by the second image forming unit such that the image on the sheet corresponds in position to the portion on the recording material.

BRIEF DESCRIPTION OF THE DRAWINGS

Exemplary embodiment(s) of the present invention will be described in detail based on the following figures, wherein

FIG. 6 is a view illustrating a feeding roller viewed in a direction of arrow VI in FIG. 1;

DETAILED DESCRIPTION

Hereinafter, exemplary embodiment(s) of the present invention will be described with reference to the accompanying drawings.

Figure 1:
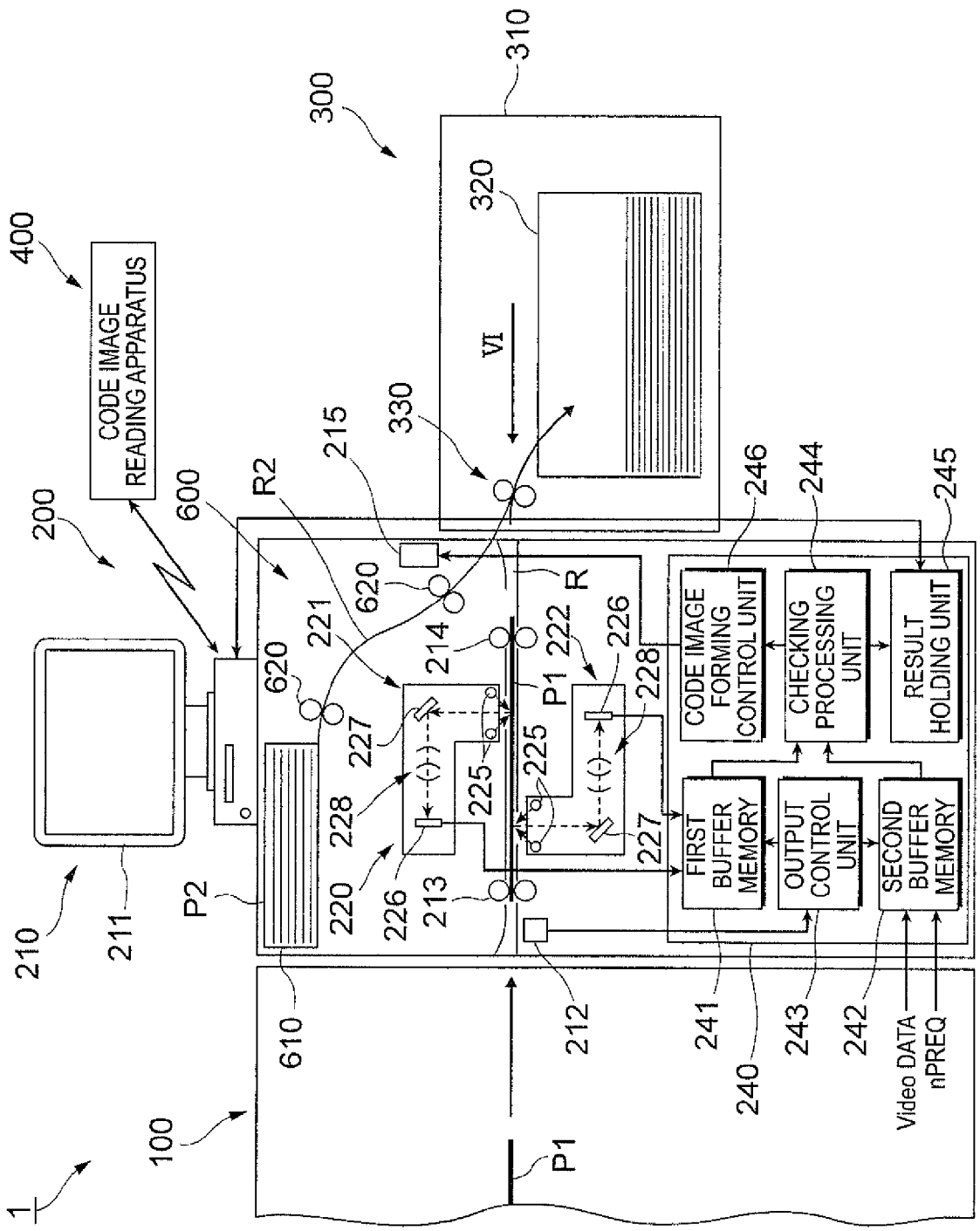
FIG. 1 is a diagram illustrating an entire configuration of an image forming system according to the present embodiment.

FIG. 1 is a diagram illustrating an entire configuration of an image forming system 1 of the present embodiment. The image forming system 1 of the present embodiment has a function of inspecting an image formed on a paper and thus, may be perceived as an image inspection system.

The image forming system 1 of the present embodiment includes an image forming apparatus 100 which forms an image on a paper P1 which is an example of a recording material, an inspection apparatus 200 which inspects the image formed on the paper P1 by the image forming apparatus 100, and a paper receiving apparatus 300 which receives the paper P1 discharged from the inspection apparatus 200.

Further, an interleaving paper supplying apparatus 600 which supplies an interleaving paper P2 between inspection-completed papers P1 sequentially discharged from the inspection apparatus 200 is installed in the present embodiment. Further, the interleaving paper P2 as an example of a sheet is formed in a color different from that of the papers P1.

Here, the interleaving paper supplying apparatus 600 is provided with: an interleaving paper receiving unit 610 in which a plurality of interleaving papers P2 are received in a stacked state; a feeding roller (not illustrated) which feeds the interleaving papers P received in the interleaving paper receiving unit 610 to an interleaving paper conveyance path R2; and a plurality of conveyance rollers 620 which conveys the interleaving paper P2 on an interleaving paper conveyance path R2 toward a more downstream side. Further, the interleaving papers P2 conveyed through the interleaving paper conveyance path R2 reach the paper receiving apparatus 300 and stacked together with the papers P1 for which an inspection has performed by the inspection apparatus 200 in the paper receiving apparatus 300.

Further, in the present embodiment, the inspection apparatus 200 is provided with a code image forming head 215. The code image forming head 215 is provided beside the interleaving paper conveyance path R2 and forms a code image on an interleaving paper P2 on the interleaving paper conveyance path R2. The inspection apparatus 200 is also provided with a control unit 240 which controls a code image forming processing by the code image forming head 215. The code image forming head 215 is configured by, for example, an inkjet head. The present embodiment is also provided with a code image reading apparatus 400 which reads the code image formed on the interleaving paper P2 by the code image forming head 215.

Here, the image forming apparatus 100 which serves as a first image forming unit acquires image data (hereinafter, referred to as "original image data") which is the basis of an image to be formed from a PC or the like which is not illustrated, and forms an image on a paper P1 using an image forming material, such as a toner, based on the acquired original image data. Further, in the present embodiment, an equipment which forms an image on the paper P1 may use various conventional methods, such as so called an electrophotographic method or an inkjet method without being particularly limited.

A terminal device 210 is installed in the inspection apparatus 200. The terminal device 210 includes a touch panel type monitor 211 and receives an operation of a user (an operator) and displays information to the user. In addition, the inspection apparatus 200 is provided with a paper conveyance path R along which the paper P1 discharged from the image forming apparatus 100 is conveyed. Further, the inspection apparatus 200 is provided with an edge detection sensor 212 disposed beside the paper conveyance path R to detect an edge of a leading end portion of the paper P1 and a first transfer roller 213 which transfers the paper P1, which has passed through the edge detection sensor 212, toward a more downstream side.

Further, the inspection apparatus 200 is provided with a second transfer roller 214 which serves as a conveying unit that sequentially conveys papers P1 for which an image reading has performed by the image reading apparatus 220 (the papers P1 for which an inspection has been finished) by the image reading apparatus 220. Here, the second transfer roller 214 is installed at the downstream side of the first transfer roller 213 in the conveying direction of the papers P1 to convey the papers P1 toward a more downstream side. Further, an image reading apparatus 220 which reads an image formed on the papers P1 is installed at a location which is at the downstream side of the first transfer roller 213 and at the upstream side of the second transfer roller 214.

The image reading apparatus 220 as an example of an image reading unit is provided with a front surface image reading apparatus 221 disposed beside one side of the paper conveyance path R (in the drawing, disposed above the paper conveyance path R) to read an image formed on the front surface of each of the papers P1 and a rear surface image reading apparatus 222 disposed beside the other side of the paper conveyance path R (in the drawing, disposed below the paper conveyance path R) to read an image formed on the rear surface of each of the papers P1.

Here, each of the front surface image reading apparatus 221 and the rear surface image reading apparatus 222 is provided with: a light source 225 which irradiates light onto the papers P1; a line sensor 226 which receives the light reflected from the papers P1 by a plurality of light receiving elements and generates an image data (hereinafter, referred to as "read image data"); and a reflector 227 which guides the light reflected from the papers P1 to the line sensor 226. Further, each of the image reading apparatuses is provided with an imaging optical system 228 which causes the light reflected from each of the papers P1 guided by the reflector 227 to form an image on the line sensor 226.

Next, the control unit 240 will be described. The control unit 240 is provided with a first buffer memory 241 which accumulates the read image data output from the front surface image reading apparatus 221 and the rear surface image reading apparatus 222. Further, the control unit 240 is provided with a second buffer memory 242 which accumulates the original image data transmitted from the image forming apparatus 100 or the PC (not illustrated).

Further, the control unit 240 includes an output control unit 243 which controls the outputting of image data (the original image data and the read image data) from the first buffer memory 241 and the second buffer memory 242 to a checking processing unit 244. In the present embodiment, the checking processing unit 244 performs comparison of the read image data and the original image data. In order to more easily perform the comparison, it is desirable to perform gray scale conversion or resolution conversion for the original image data when the original image data is stored in the second buffer memory 242.

Here, the output control unit 243 controls the outputting of the image data from the first buffer memory 241 and the second buffer memory 242 such that the output timing of the read image data stored in the first buffer memory 241 from the first buffer memory 241 coincides with the output timing of the read image data stored in the second buffer memory 242 from the second buffer memory 242.

More specifically, the output control unit 243 outputs sequentially the original image data and the read image data for one page (for one paper) from the first buffer memory 241 and the second buffer memory 242. However, at this time (when starting the outputting of the image data of each page), for example, image data corresponding to an image formed at the leading end of each page is output first and image data corresponding to an image formed at the trail end of each page is output finally.

Further, in the present embodiment, the output initiation timing of the read image data from the first buffer memory 241 is made to coincide with the output initiation timing of the original image data from the second buffer memory 242. Also, even when the image data corresponding to the image formed at the trail end of each page is output, the output timing of the read image data is made to coincide with the output timing of the original image data. Accordingly, in the present embodiment, when the original image data and the read image data are compared with each other in the checking processing unit 244, a location on a paper P1 of an image specified by the original image data coincides with a location on the paper P1 of an image specified by the read image data.

Furthermore, in the present embodiment, an output from the edge detection sensor 212 is output to the output control unit 243, and the output control unit 243 determines that the leading end of a paper P1 reaches the edge detection sensor 212. Further, a clock signal synchronized with image reading is transmitted simultaneously with the read image data from the front surface image reading apparatus 221 and the rear surface image reading apparatus 222 to the first buffer memory 241. Further, the original image data is transmitted simultaneously with a page synchronization signal to the second buffer memory 242. The output control unit 243 determines the timings of outputting the original image data and the read image data based on, for example, an output from the edge detection sensor 212, the clock signal, and the page synchronization signal.

Further describing the control unit 240, the control unit 240 is provided with the checking processing unit 244 which compares the read image data output from the first buffer memory 241 and the original image data output from the second buffer memory 242. Further, the control unit 240 is provided with a result holding unit 25 which holds a comparison result by the checking processing unit 244. The control unit 240 further includes a code image forming control unit 246 which controls the code image forming head 215 based on the comparison result by the checking processing unit 244.

Further, the checking processing unit 244 divides each of the read image data sent from the first buffer memory 241 and the original image data sent from the second buffer memory 242 into predetermined regions and also performs a pattern matching processing for each region to determine whether or not a defect occurs in the formed image. More specifically, the checking processing unit 244 specifies whether or not an image formed on a paper P is formed to satisfy a predetermined requirement based on the read image data sent from the first buffer memory 241 and the original image data output from the second buffer memory 242.

In a typical pattern matching scheme, predetermined parameters such as pixel concentration values, for example, per plural pixels contained in each of two areas set as targets for comparison are compared to obtain a difference between the two parameters. Also, the sum of absolute values of plural differences obtained by comparison of respective pixels is calculated and it is determined whether or not the sum of absolute values exceeds a predetermined threshold value. When the sum of the absolute values exceeds the predetermined threshold value, it is determined that a defect occurs in the image (a portion thereof).

In addition, the control unit 240 is configured by, for example, a CPU (Central Processing Unit) which executes an arithmetic processing, a nonvolatile ROM (Read Only Memory) which stores a control program or a HDD (Hard Disk Drive), a RAM (Random Access Memory) which stores data temporarily, or the like. Here, the control unit 240 executes, for example, the control program stored in the ROM in order to serve as the output control unit 243, the checking processing unit 244, and the code image forming control unit 246. Further, the first buffer memory 241, the second buffer memory 242, and the result holding unit 245 are implemented by a RAM or an HDD.

Next, the paper receiving apparatus 300 will be described. The paper receiving apparatus 300 of the present embodiment which serves as a stacking unit is provided with a casing 310. The paper receiving apparatus 300 is also provided with a paper stacking unit 320 which is accommodated in the casing 310 and in which papers P1 sequentially discharged and sent from the inspection apparatus 200 and interleaving papers P2 supplied by the interleaving paper supplying apparatus 600 are stacked. The paper receiving apparatus 300 is also provided with a feeding roller 330 which feeds the papers P1 discharged and sent from the inspection apparatus 200 and the interleaving papers P2 supplied by the interleaving paper supplying apparatus 600 to the paper stacking unit 320.

Figure 2:
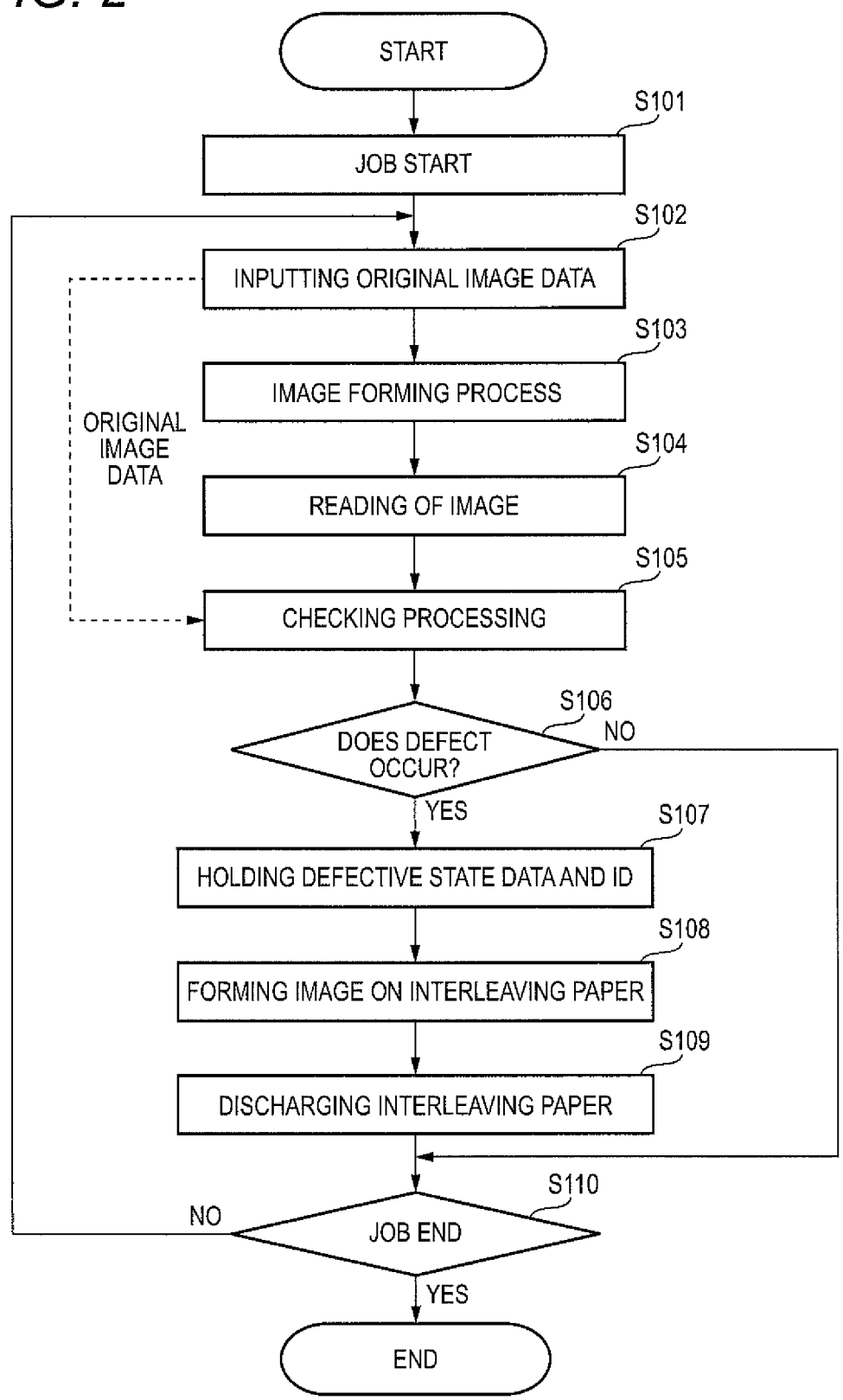
FIG. 2 is a flow chart illustrating flow of a process executed by the image forming system of the present embodiment.

FIG. 2 is a flow chart illustrating a flow of process executed by the image forming system 1 of the present embodiment.

In the present embodiment, when a user presses a start button (not illustrated), an image forming processing is started based on a print job (step 101). Specifically, first, the original image data provided from the user is input to the image forming apparatus 100 (step 102). Thus, the image forming apparatus 100 executes the image forming process (step 103). The original image data provided from the user is also stored in the second buffer memory 242 of the inspection apparatus 200 (see FIG. 1), and is used for a comparison processing to be described later.

Thereafter, according to the image forming process, papers P1 sequentially discharged from the image forming apparatus 100 are sent to the inspection apparatus 200 and reading of an image on each of the papers P1 is performed by the inspection apparatus 200 (step 104). Further, the read image data obtained by the image reading is stored in the first buffer memory 241 illustrated in FIG. 1. Thereafter, in the present embodiment, the checking processing unit 244 of the inspection apparatus 200 performs a comparison processing (step 105). Specifically, the read image data stored in the first buffer memory 241 and the original image data stored in the second buffer memory 242 are used to perform the pattern matching processing.

Subsequently, the checking processing unit 244 determines whether or not a defect occurs in an image formed on a paper P1 based on the pattern matching processing (step 106). When the checking processing unit 244 determines that no defect occurs, a main control unit (not illustrated) determines whether or not the print job is entirely ended (step 110). When it is determined that the print job is ended, the entire processing is ended. On the contrary, when it is determined that the print job is not ended, the processing steps after step 102 is executed again.

Meanwhile, when it is determined that a defect occurs at step 106, the checking processing unit 244 correlates defective situation data configured by, for example, page information (page number) for a page in which a defect occurs, a defect occurrence position (a position within the page), a defective degree, the number of defects, original image data and read image data with identification information (ID) for identifying the corresponding defective situation data from other defective situation data and then, outputs the defective situation data and the identification information to the result holding unit 245 which serves as a storage unit.

Thus, the defective state data and the identification information related with each other are held in the result holding unit 245 (step 107). Thereafter, the code image forming control unit 246 (see FIG. 1) generates a code image based on the identification information and forms the generated code image on an interleaving paper P2 placed on the interleaving paper conveyance path R2 of the interleaving paper supplying apparatus 600 using the code image forming head 215 (step 108). More specifically, in the present embodiment, an identification image which enables identification from other interleaving papers P2 is formed on the interleaving paper P2 by the code image forming control unit 246 which serves as a portion of a second image forming unit.

Thereafter, in the present embodiment, the interleaving paper P2 on which the code image is formed reaches the paper stacking unit 320 provided in the paper receiving apparatus 300 and is stacked on a paper P1 specified as a paper on which a defect has occurred (hereinafter, the paper P1 may be referred to as a "defective paper P1") (the defective paper P1 and the interleaving paper P2 contact with each other) (step 109).

Further, in the present embodiment, an interleaving paper P2 is supplied between a defective paper P1 and another paper P1 (a subsequent paper) which is conveyed subsequently just after the defective paper P1, using the interleaving paper supplying apparatus 600 which serves as a supplying unit. Accordingly, as described above, the interleaving paper P2 is stacked on the defective paper P1. However, without being limited to such an aspect, for example, the corresponding interleaving paper P2 may be supplied between a defective paper P1 and another paper P1 (a preceding paper) which has been conveyed just before the defective paper P1. In this case, the paper P1 is stacked on the interleaving paper P2.

Thereafter, in the present embodiment, it is determined whether or not the print job is entirely ended at step 110. When it is determined that the print job is entirely ended, the entire processing is ended. On the contrary, when it is determined that the print job is not ended, the processing steps after step 102 are executed again.

Figure 3B:
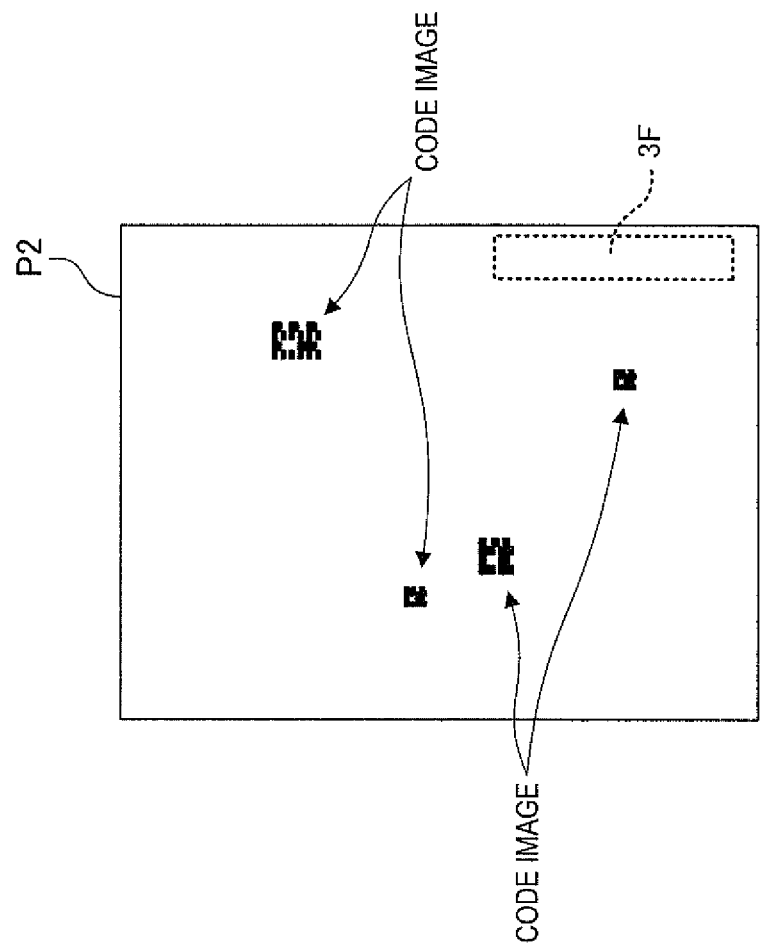
FIGS. 3A and 3B are views illustrating a defective paper and an interleaving paper stacked on the defective paper, respectively.
Figure 3A:
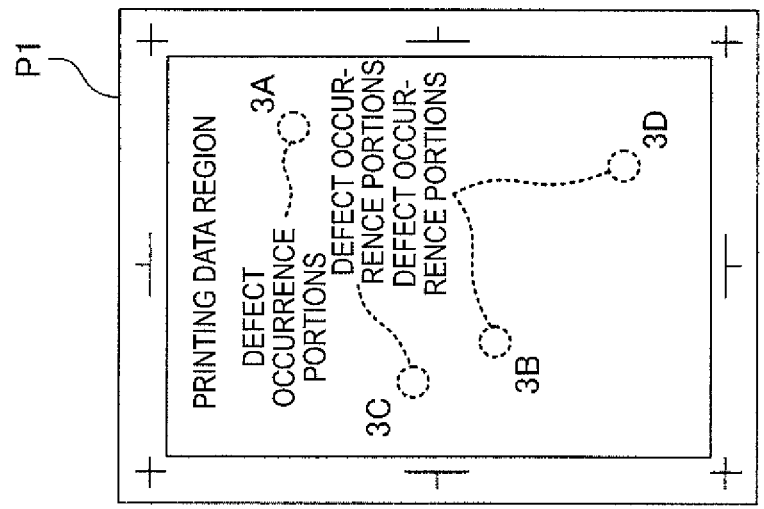

FIGS. 3A and 3B are views illustrating a defective paper P1 and an interleaving paper P2 stacked on the defective paper P1, respectively.

Here, in the example illustrated in FIGS. 3A and 3B, a case where defects occur at four places of the printing data region of the defective paper P1 is exemplified illustrated in FIG. 3B. In this case, in the present embodiment, four code images are formed on the interleaving paper P2 (a portion thereof) as illustrated in FIG. 3B. More specifically, four code images are formed on the interleaving paper P2 such that the positions of the plural defect occurrence portions on the defective paper P1 are matched with the positions of the plural code images formed on the interleaving paper P2, respectively. Further, in the present embodiment, the forming of the code images on the interleaving paper P2 is performed based on the defect occurrence positions (position information) included in the defective state data.

In addition, in the present embodiment, a positional relationship between the defect occurrence portions where the defects occur on the defective paper P1 is adapted to correspond to a positional relationship between the code images on the interleaving paper P2. Further, in the present embodiment, a case where the code images are formed such that the defect occurrence portions and the code images overlap with each other when the defective paper P1 contact with the interleaving paper P2 is described as an example. As another example in which the positional relationship between the defect occurrence portions on the defective paper P1 corresponds to the positional relationship between the code images on the interleaving paper P2, a case where the code images are formed on the interleaving paper P2 after the image formed on the interleaving paper P2 is enlarged or reduced (image formed of four code images) while maintaining the positional relationship between the four defect occurrence portions on the defective paper P1 and a positional relationship of the four code images formed on the interleaving paper P2 may be referred to.

Although not described in the above description, the same identification information is included in the four code images formed in the present embodiment. Additionally, the four code images are formed based on the same identification information. Further, the code images may but not exclusively use, for example, one-dimensional barcodes or two-dimensional barcodes such as QR codes (registered trademark).

Further, in the present embodiment, sizes of the code images are set differently depending on the defective degree of the defects of the defect occurrence portions on the defective paper P1. Specifically, the larger the defective degree, the larger the code image.

In the example illustrated in FIGS. 3A and 3B, the degree of the defect of the defect occurrence portion 3A located in the right upper portion in FIG. 3A is the largest, and as illustrated in FIG. 3B, the code image formed in corresponding to the defect occurrence portion 3A is the biggest. Further, in the present embodiment, the defective degree of the defect of the defect occurrence portion 3B located in the left lower portion in FIG. 3A is the second largest, and as illustrated in FIG. 3B, the code image formed in corresponding to the defect occurrence portion 3B is the second biggest. Whereas, the degrees of defects of the defect occurrence portion 3C located in the left upper portion and the defect occurrence portion 3D located in the right lower portion are smaller, and as illustrated in FIG. 3B, the code images formed in corresponding to the defect occurrence portion 3C and the defect occurrence portion 3D become smaller.

Here, after the image forming on the paper P1 is ended (after the inspection by the inspection apparatus 200 is ended), a quality of the image, for which it has been determined that a defect occurs, may be confirmed by the user. In this case, in the present embodiment, the interleaving paper P2 is found in the paper stacking unit 320 (see FIG. 1) by the user first. Further, in the present embodiment, as described above, the interleaving paper P2 is formed in a color different from that of the paper P1 so that the interleaving paper P2 can be easily found.

Thereafter, in the present embodiment, the code image reading apparatus 400 illustrated in FIG. 1 is operated by the user to read the code images on the interleaving paper P2. Further, the code image reading apparatus 400 is configured as a portable apparatus, and the reading of the code images is performed in a state where the interleaving paper P2 is stacked in the paper stacking unit 320. In other words, the code images are read from the interleaving paper P2 which is still stacked in the paper stacking unit 320.

Also, when the code images on the interleaving paper P2 are read, information on the defects is displayed on the monitor 211 (see FIG. 1). Further, descriptions are omitted in the foregoing, the code image reading apparatus 400 may include, for example, a bar code reader. Further, it may be configured to use a mobile phone or a smart phone equipped with a camera as the code image reading apparatus 400 without being limited to an exclusive apparatus such as the bar code reader.

Figure 4:
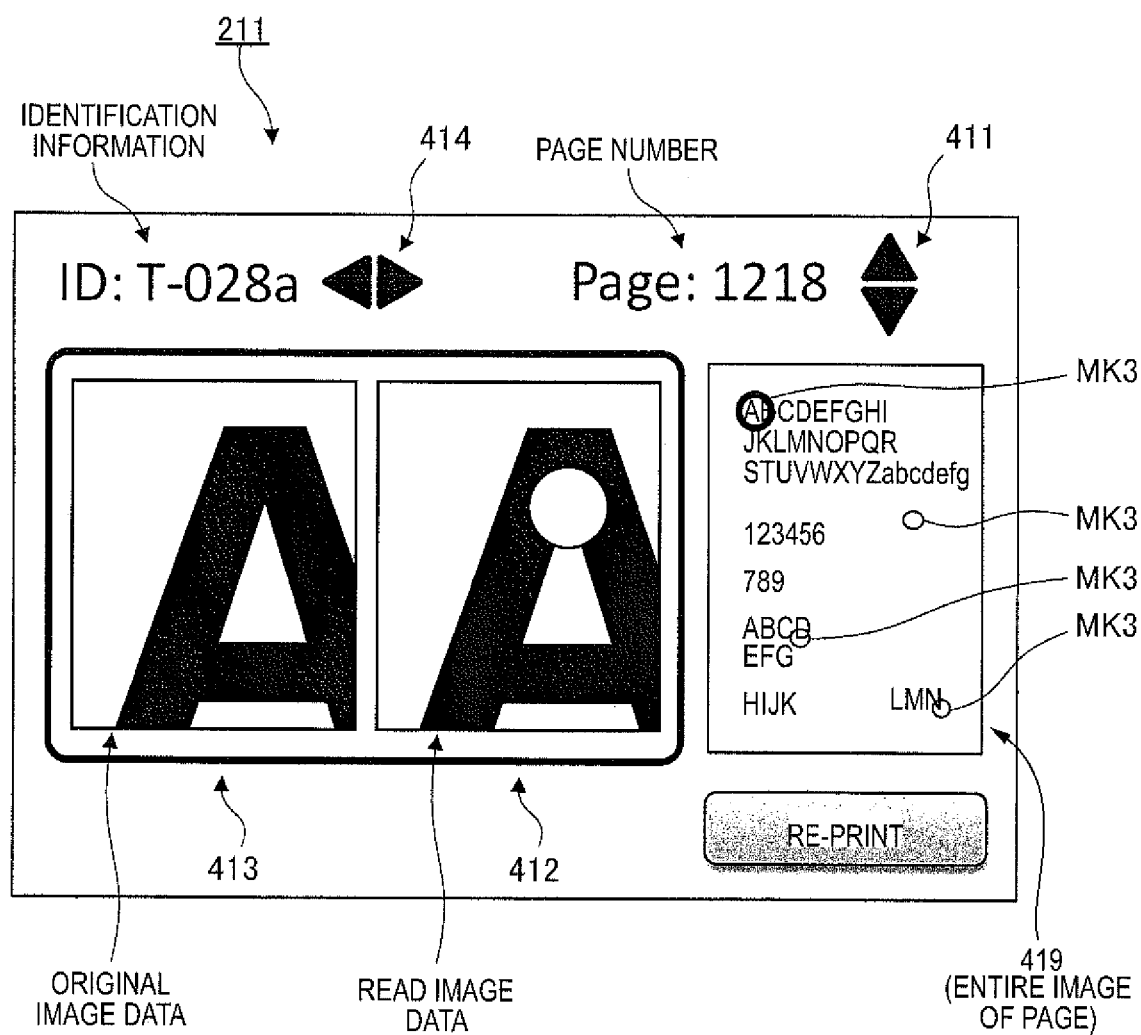
FIG. 4 is a view illustrating an example of a display screen in a monitor.

FIG. 4 is a view illustrating an example of a display screen in the monitor 211.

In the present embodiment, identification information (ID) obtained by reading a code image is displayed in the left upper portion of the drawing on the display screen in the monitor 211. Further, the page number of the page which is being displayed currently on the display screen (the page number of the defective paper P1 placed under the interleaving paper P2 and superimposed on the interleaving paper P2 in the paper stacking unit 320) is displayed in the right upper portion of the display screen. In addition, two triangles are displayed at the right side of the place where the page number is displayed to display a page switching operation unit 411 operated (pressed) by the user when switching from the corresponding page to another page.

Further, in the present embodiment, the entire image 419 of the currently displayed page is displayed on the right portion in the middle section of the display screen. Further, four circular marks MK3 are displayed on the entire image 419, and in the present embodiment, it is shown that defects occur in the places where the four circular marks MK3 are displayed. In other words, in the present embodiment, information (an image) indicating the defect occurring places is adapted to be displayed on the entire image 419 displayed on the display screen. Further, in the present embodiment, an enlargement display unit 412 in which a defect occurring place is enlarged and displayed is provided at the center of the middle section of the display screen.

In other words, the enlargement display unit 412 which enlarges and displays an image based on the read image data of the defect occurring place is provided at the center of the middle section of the display screen. Further, in the present embodiment, among the four marks MK3, the mark MK3 (MK3 located uppermost in the FIG. 4) which surrounds the defect (defective image) displayed on the enlargement display unit 412 is indicated by a bold line to be highlighted and displayed. Accordingly, the user may easily recognize which defect among the plural defects displayed on the entire image 419 is enlarged and displayed on the enlargement display unit 412.

In the present embodiment, an original image display unit 413 which displays an image based on the original image data is provided at the left of the middle section of the display screen (at the left of the enlargement display unit 412). In other words, the original image display unit 413 which enlarges and displays an image based on the original image data corresponding to the defect occurring place, among the original image data, is provided at the left portion of the middle section of the display screen. Here, in the present embodiment, as described above, images are displayed in a state where the enlargement display unit 412 and the original image display unit 413 are located adjacent to each other and thus, it is easy to compare the image displayed on the enlargement display unit 412 with the image displayed on the original image display unit 413.

Further, in the present embodiment, a "re-print button" operated (pressed) by a user when the user wants re-print is displayed at the right side of the lower section on the display screen. Here, when the user determines that a defect exceeding a limitation occurs as a result of confirming the display screen, the re-print button is pressed by the user.

When the re-print button is pressed, image forming is performed with the image forming apparatus 100 (FIG. 1), a new paper P1 on which an image is formed is stacked uppermost in the paper stacking unit 320. Further, when the re-print is performed under a situation where plural papers P1, on which the same image is formed, are prepared, the problem may be solved only by removing defect occurring papers P1 from the paper stacking unit 320. Meanwhile, when images formed in the respective papers P1 are different from each other as in a case where a booklet is prepared, a defect occurring paper P1 (a defective paper P1 which is still stacked in the paper stacking unit 320) is needed to be replaced with a re-printed paper P1.

In any case, when the re-print is performed, it is needed to specify and remove a defective paper P1 among the plural papers P1 stacked in the paper stacking unit 320. Further, besides the case of re-print, it is needed to specify a defective paper P1 among the plural papers P1 stacked in the paper stacking unit 320. For example, some users may want to confirm a defect with eyes in addition to the defect confirmation in the monitor 211 or want to directly confirm a defective paper P1 with eyes while omitting the defect confirmation in the monitor 211.

More specifically, in the present embodiment, read image data and original image data are displayed on the monitor 211 so that the user confirms the monitor 211 to confirm the defective degree. However, it may be difficult to confirm the defective degree of on the monitor 211. In this case, the user needs to specify a defective paper P1 among the plural papers P1 stacked in the paper stacking unit 320.

Here, in the present embodiment, specifying a defective paper P1 is performed in reliance on an interleaving paper P2 which is still stacked on in paper stacking unit 320. Here, the interleaving paper P2 is formed in a color different from that of the papers P1 and thus, it is easy to find out the interleaving paper P2.

When plural sheets of interleaving papers P2 are stacked in the paper stacking unit 320, it becomes difficult to find out the interleaving papers P2. In this case, for example, the interleaving papers P2 may be found out due to a difference between the code images on the interleaving papers P2. However, when a code image is a simple symbol, it becomes difficult to discriminate the code image from the other code images formed on the other interleaving papers P2 and thus, it becomes difficult to specify the interleaving papers P2. For this reason, it is desirable to include numbers, letters, and symbols in the code images so that the code images may be easily discriminated.

Further, for example, the interleaving paper P2 may be specified easily using the monitor 211. Specifically, for example, an "interleaving paper search" button is displayed on the monitor 211. Also, when the "interleaving paper search" button is pressed by the user, the user is instructed to sequentially perform the reading of the code images formed on the interleaving paper P2 (reading by the code image reading apparatus 400) using the monitor 211.

Specifically, for example, the user is instructed to go to the paper stacking unit 320 and to perform the reading of the code images from each of the interleaving papers P2 present in the paper stacking unit 320. Also, when identification information read by the code image reading apparatus 400 coincides with identification information of a target interleaving paper P2 to be specified, the user is notified to that effect through the monitor 211. Accordingly, the user is able to easily specify the interleaving paper P2.

Descriptions will be further made on the display on the monitor 211 with reference to FIG. 4. In the present embodiment, a switching operation unit 414 manipulated by the user when switching a defective place displayed on the enlargement display unit 412 to another defective place is provided at the right of the identification information displayed place.

Here, when the switching operation unit 414 is operated by the user, among the remaining three marks MK3, a place (a defective place) surrounded by the mark MK3 surrounding defect of which the defective degree is the second-largest is displayed on the enlargement display unit 412. Also, when the switching operation unit 414 is operated further by the user, a place (a defective place) surrounded by the mark MK3 surrounding a defect of which the defective degree is the third-largest is displayed on the enlargement display unit 412.

When the switching operation unit 414 is operated again by the user, a place (a defective place) surrounded by the mark MK3 surrounding a defect of which the defective degree is the fourth-largest is displayed on the enlargement display unit 412. That is, in the present embodiment, a place with the largest defective degree is displayed on the enlargement display unit 412 first, and thereafter, whenever the switching operation unit 414 is operated, a defect with a lesser defective degree is displayed. Also, in the present embodiment, when the switching operation unit 414 is operated by the user to switch the display on the enlargement display unit 412, the display on the original image display unit 413 is also switched correspondingly.

Here, when defects are displayed in order from the defect with the largest defective degree to the defect with the smallest defective degree as in the present embodiment, the user's effort required for confirming the defects may be reduced. More specifically, for example, when the user has performed re-printing based on the defect displayed first, the user ends the process without confirming the remaining defects. Here, when defects are displayed in order from the defect with the smallest defective degree to the defect with the largest defective degree an ascending order of defective degree by reversing the displaying order, re-printing may be performed more frequently based on the defect displayed last. In this case, the number of times of manipulating the switching operation unit 414 by the user increases and thus, the user's efforts or time required for confirming the defects increases.

Figure 5:
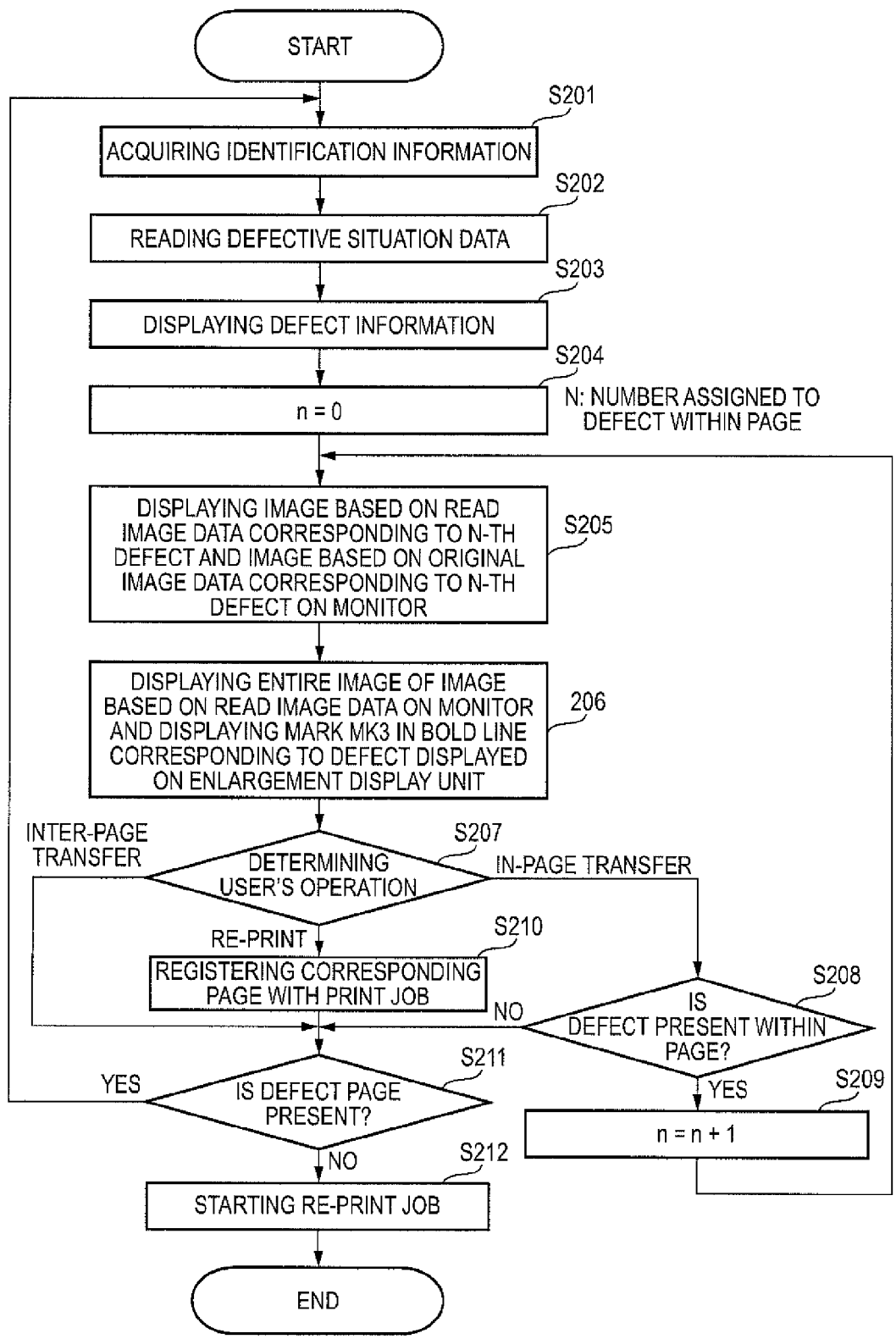
FIG. 5 is a flow chart illustrating flow of a series of processings executed when the display process is performed in the monitor.

FIG. 5 is a flow chart illustrating a flow of a series of processings executed when the display process is performed in the monitor 211.

In the present embodiment, as described above, the reading of the code image on an interleaving paper P2 is performed by the code image reading apparatus 400 first, and identification information (ID) is acquired (step 201). Further, in the present embodiment, a case where a code image is read by the code image reading apparatus 400 to acquire the identification information has been described as an example. However, for example, it may be configured such that the user may acquire the identification information by manipulating a ten-key (not illustrated) provided on the terminal device 210 (see FIG. 1).

Subsequently, in the present embodiment, the terminal device 210 (see FIG. 1) accesses the result holding unit 245 to read the defective situation data (defective situation data on the defective paper P1 placed under the interleaving paper P2 and stacked to contact with the interleaving paper P2 in the paper stacking unit 320) stored to be correlated with the identification information by the terminal device 210 (step 202). Accordingly, page information (the page number) for a defect page (defect occurring page), the defect occurrence position (the position within a page), the defective degree, the number of defective images, the original image data of the defect page and the read image data of the defect page are output to the terminal device 210.

Subsequently, the terminal device 210 displays defect information which is information related to defects on the monitor 211 similarly to the display screen illustrated in FIG. 4 (step 203). Subsequently, the terminal device 210 sets a counter value n as n=0 (step 204). The counter vale n is a number assigned to each defect by the checking processing unit 244 (see FIG. 1) in order to identify each defect. Further, in the present embodiment, the counter vale n is set to gradually become smaller as the defective degree becomes larger. Accordingly, as described above, in the present embodiment, defective places are displayed on the monitor 211 in order from the defect with the largest defective degree to the defect with the smallest defective degree.

Subsequently, as illustrated in FIG. 4, an image based on the read image data corresponding to the n-th defect and an image based on the original image data corresponding to the n-th defect are displayed on the monitor 211 of the terminal device 210 which serves as an image forming unit (step 205). Further, the entire image 419 (see FIG. 4) of the image based on the read image data is displayed on the monitor 211 is displayed and at the same time, a mark MK3, which corresponds to the defect displayed on the enlargement display unit 412 among the marks MK3, is indicated by a bold line (highlighted) (step 206).

Subsequently, when the user's operation of the monitor 211 is received by the terminal device 210 (when the user's operation of the monitor 211 is detected), the terminal device 210 specifies what is the user's operation (instruction) among in-page transfer, re-print and inter-page transfer (step 207). Also, for example, when the operation corresponds to the in-page transfer [when the switching operation unit 414 (see FIG. 4) is operated], it is determined whether or not a defect is still present within the same page (step 208). When it is determined that defect is still present within the same page, the count number is set as n=n+1 (step 209), and then, the processings after step 205 are executed again.

Meanwhile, at step 208, when it is determined that no defect is present within the same page, it is determined whether or not other defect page is present (whether or not other interleaving paper P2 for which the reading of the code image has been performed by the code image reading apparatus 400 is present) (step 211). Also, when it is determined that the other page is present, the processing at step 201 is executed again. In addition, at step 207, also when it is determined that the user's operation (instruction) is inter-page transfer, the processing at step 211 is executed again to determine whether or not other defect page is present.

At step 207, when it is determined that the user's operation corresponds to an instruction to re-print, image data (the original image data) of the page to be re-printed is registered as a re-print job (step 210). Thereafter, the processing of step 211 is executed to determine whether or not other defect page is present. Here, if the operation by the user corresponds to an instruction to re-print, the processings of step 208, step 209, step 205 and step 206 are omitted.

That is, even when other defects which are not yet displayed on the monitor 211 are present in the same page, the displaying of the defects is omitted. Additionally, in the present embodiment, when plural defect occurring places are present in one page, the defect occurring places are enlarged and displayed sequentially as described above. However, when an instruction to re-print is issued from the user, displaying of a place which is not yet displayed on the monitor 211 among the defect occurring places is omitted.

Next, the processing of step 212 will be described.

At step 211, when it is determined that other defect page is not present, the processing of step 212 is executed. In the processing of step 212, the re-printing is performed based on the re-print job registered at step 210. Further, at this time, in the present embodiment, a predetermined inquiry screen is displayed on the monitor 211 to demand permission of printing from the user. Also, when the permission is issued from the user, the reprinting is started.

Further, in the processings of the present embodiment, when defects occur over plural pages, registration of the re-print job is performed in each page, and finally the registered re-print jobs are combined and re-printing is performed. However, re-printing may be performed, for example, whenever the registration of the re-print job is performed, without being limited to such processings.

Here, it is difficult for the inspection apparatus 200 to perform subjective inspection as is conducted by a person. Accordingly, an image specified as one in which a defect occurs by the inspection apparatus 200 may be specified as one in which no defect occurs when it is determined by a person. Under this situation, it is improper to indiscriminately dispose images specified by the inspection apparatus 200 as ones in which defects occur. Therefore, even for an image specified as a defective image by the inspection apparatus 200, it is desirable to perform a confirmation by the user. However, in general, when a defect occurs, it becomes difficult to find out a paper P1 specified by the inspection apparatus 200, among a large quantity of the stacked papers P1.

Accordingly, in the present embodiment, as described above, an interleaving paper P2 on which the code image is formed is stacked on a defect occurring paper P1. In this way, in the present embodiment, the user may find out the paper P1 specified as a defective paper by the inspection apparatus 200 more rapidly.

Further, in the present embodiment, as described above, an image of a detect occurring place and an image which corresponds to the defect occurring place and is based on the original image data are displayed on the monitor 211. Accordingly, the eyes of the user move minimally, for example, as compared to a case where only the image based on the original image data is displayed, and a determination as to whether or not the defect occurring place is actually a defective place is performed more rapidly.

Further, in the present embodiment, the user may determine whether or not a defective paper P1 is defective without picking the defective paper P1 out from the paper stacking unit 320. In this case, when the user determines that the paper is not defective, the user ends the process without performing a job such as returning the paper into a bundle of the papers P1 within the paper stacking unit 320. When it is essential to pick the paper P1 out from the paper stacking unit 320, it is necessary to return the paper P1 into the paper stacking unit 320 even when the user determines that no defect occurs.

Further, in the present embodiment, although the code image reading apparatus 400 is configured to have a reading function of code images, a monitor for displaying the screen illustrated in FIG. 4 may be installed in the code image reading apparatus 400. Also, defect situation data may be transmitted to the code image reading apparatus 400 so that the screen illustrated in FIG. 4 is displayed by the code image reading apparatus 400. In this case, the user may confirm the defective degree using the paper stacking unit 320 without going to the monitor 211.

Further, there may be a case where a defect is confirmed directly by confirming the defect with the eyes depending on the user. However, in the present embodiment, since both of an interleaving paper P2 and a defective paper P1 contacting with the interleaving paper P2 are extracted from the paper stacking unit 320, a defect is confirmed by the user more rapidly.

Here, in the present embodiment, as illustrated in FIGS. 3A and 3B, the positions of defect occurrence portions in the defective paper P1 are aligned with the positions of code images on the interleaving paper P2, respectively. In this case, the user may recognize the defect occurrence portions in the defective paper P1 by recognizing the positions of the code images on the interleaving paper P2. Also, in this case, the user may recognize the defect occurrence portions in the defective paper P1 more rapidly and thus, the defects are confirmed more rapidly by the user.

Further, in the present embodiment, as illustrated in FIGS. 3A and 3B, the sizes of the code images are differently set depending on the defective degrees of the defects occurring in the defective paper P1. Specifically, as described above, the larger the defective degree, the larger the code image. When the defects are confirmed directly by confirming the defects with the eyes of the user, the user confirms the defect occurrence portions sequentially. However, when the sizes of the code images are different depending on the defective degrees, the user may begin confirming defects from, for example, a defect with a larger defective degree. In this case, even if all of the occurring defects are not confirmed, the user may confirm whether or not a defect occurs in the image on the defective paper P1.

Although not described in the above-description, when an interleaving paper P2 or a defective paper P1 is stacked in the paper stacking unit 320 (see FIG. 1), the interleaving paper P2 or the defective paper P1 may be stacked after being offset. In other words, after displacing a stacking position of an interleaving paper P2 and a defective paper P1 from a stacking position of a paper P1 (hereinafter, may be referred to as "normal paper P1") other than the interleaving paper P2 and the defective paper P1, the interleaving paper P2, the defective paper sheet P1, and the normal paper sheet P1 may be stacked in the paper stacking unit 320. In this case, it becomes easy to find out the interleaving paper P2 or the defective paper P1 among plural papers P1 stacked in the paper stacking unit 320. Further, regarding the offsetting, the interleaving paper P2 and the defective paper P1 may be offset or only the interleaving paper P2 may be offset.

Further, the offsetting of the interleaving paper P2 and the defective paper P1 is performed by moving the feeding roller 330 in the axial direction, as illustrated by arrow 6A direction of FIG. 6 (a view of the feeding roller 330 viewed in the direction of arrow VI of FIG. 1). More specifically, the offsetting of the interleaving paper P2 and the defective paper P1 is performed by moving the feeding roller 330 in the axial direction during the interleaving paper P2 and the defective paper P1 are conveyed by the feeding roller 330.

Here, in a configuration example illustrated in FIG. 6, a moving mechanism 340 which is equipped with a motor or a cam (both of which are not illustrated) and which moves the feeding roller 330 along the axial direction of the feeding roller 330 is installed, and the movement of the feeding roller 330 in the axial direction is performed by the moving mechanism 340. Further, in the configuration example illustrated in FIG. 6, the feeding roller 330 is constituted with a driving roller 331 driven and rotated by a motor (not illustrated) and a driven roller 332 which is rotated following the driving roller 331 by being pressurized against the driving roller 331.

Figure 7A:
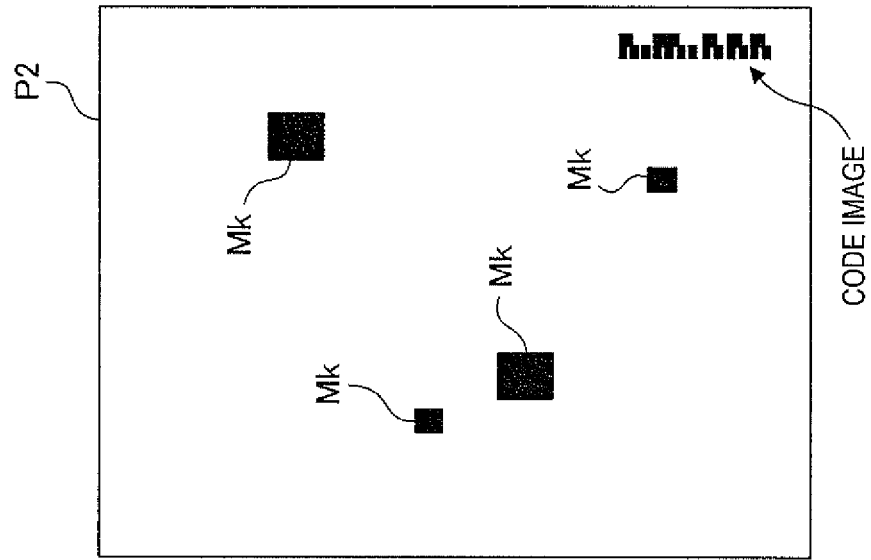
FIGS. 7A and 7B are views illustrating other examples of interleaving papers.

Further, in the present embodiment, as described above, although a case where the code image including the identification information is formed on the interleaving paper P2 has been described as an example, as illustrated in FIG. 7A (a view illustrating another example of the interleaving paper P2), marks (images) Mk may be formed instead of the code images which indicate defect occurring places in a defective paper P1. That is, an image in which the identification information is not included may be formed. In this case, it is unable to perform the displaying on the monitor 211 as illustrated in FIG. 4. But, when a defect is confirmed by confirming it with the eyes of the user, the user's convenience is enhanced.

In this example, as described above, the positions of the marks Mk in the interleaving paper P2 are made to coincide with the positions of the defect occurrence portions in the defective paper P1, respectively. Further, as described above, the sizes of the marks Mk are set differently according to the defective degrees of the defect occurring in the defect occurrence portions of the defective paper P1. Specifically, the larger the defective degree, the larger the mark Mk.

Figure 7B:
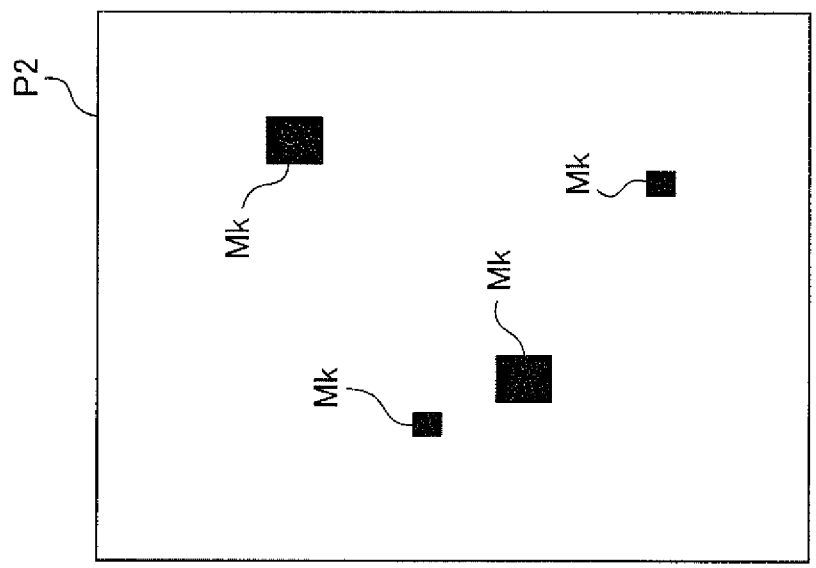

Further, as illustrated in FIG. 7B, a code image formed based on the identification information may be formed on the interleaving paper P2 in addition to the marks Mk. In this case, the identification information may be acquired by reading the code image and thus, the displaying illustrated in FIG. 4 may be performed.

Further, when the code image is formed as illustrated in FIG. 7B, it is desirable to form the code image at a side of the interleaving paper P2. In the present embodiment, as described above, the code image may be read from the interleaving paper P2 in a state in which the interleaving paper P2 is stacked in the paper stacking unit 320. Accordingly, when the code image is formed at the side of the interleaving paper P2a, it becomes easy to read the code image.

Although not described in the above description, the code image may be further formed on, for example, a place denoted by a reference numeral 3F of FIG. 3B. That is, the code image for facilitating the reading by the code image reading apparatus 400 may be separately formed in addition to the code image used for indicating a defect occurring position in the defective paper P1. In the present example, as described above, the code image is added to and formed at a side of the interleaving paper P2, and the reading of the code image may be facilitated similarly to the aspect illustrated in FIG. 7B.

Figure 8B:
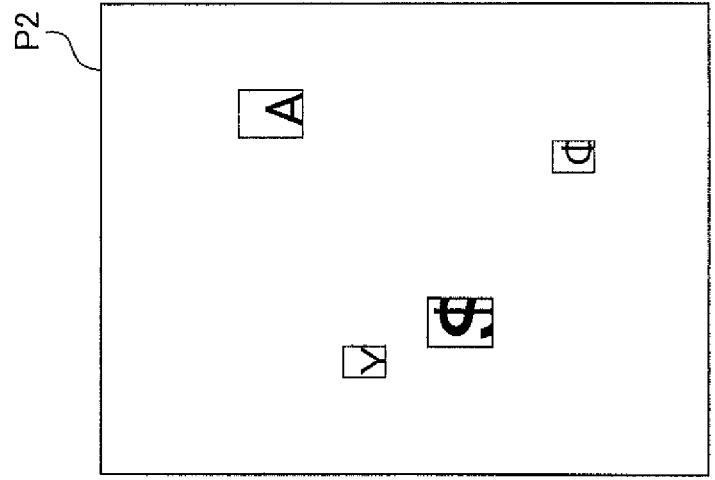
FIGS. 8A and 8B are views illustrating other examples of a defective paper and an interleaving paper, respectively.
Figure 8A:
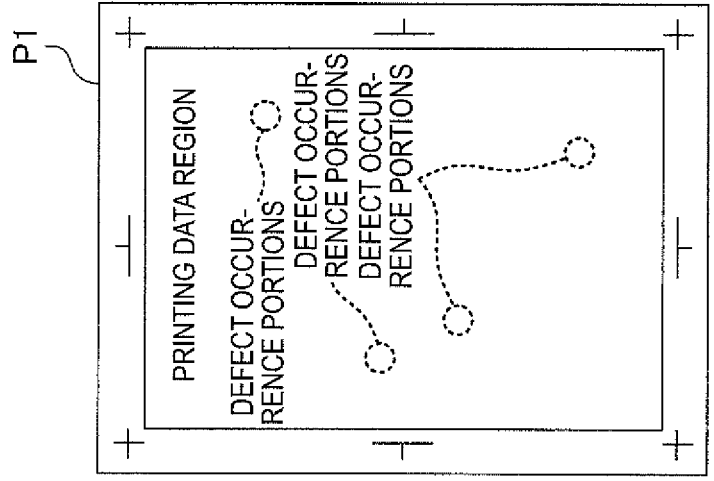

Further, as illustrated in FIG. 8B (view illustrating another example of the interleaving paper P2), an image based on the original image data may be formed on a position of the interleaving paper P2 which corresponds to the position of the defect occurrence portion in the defective paper P1. Additionally, an image based on the original image data which becomes the basis of an image formed on each of the defect occurrence portions in the defective paper P1 may be formed on the interleaving paper P2. In this case, when confirming the defect occurrence portions in the defective paper P1, the user may recognize the positions of the defect occurrence portions more rapidly. Further, although it is able to determine whether the image on the defective paper P1 is good or bad depending on the resolution of the image formed on the interleaving paper P2, it may be determined whether the image on the defective paper P1 is good or bad only by confirming two sheets of the interleaving papers P2 and the defective paper P1 without confirming the monitor 211.

Further, in the present embodiment, the interleaving paper P2 and the defective paper P1 are stacked to be superimposed on each other in the paper stacking unit 320. However, in this case, as illustrated in FIG. 9A (a view illustrating a stacked state of papers in the paper stacking unit), when viewing the interleaving paper P2 from a front surface side where the code image is formed, it is desirable that the defective paper P1 is positioned at the rear side of the interleaving paper P2. In this case, when the interleaving paper P2 is turned up, the defective paper P1 appears and thus, it becomes easy to recognize the image on the defective paper P1 while confirming the position of the code image on the interleaving paper P2.

Figure 9B:
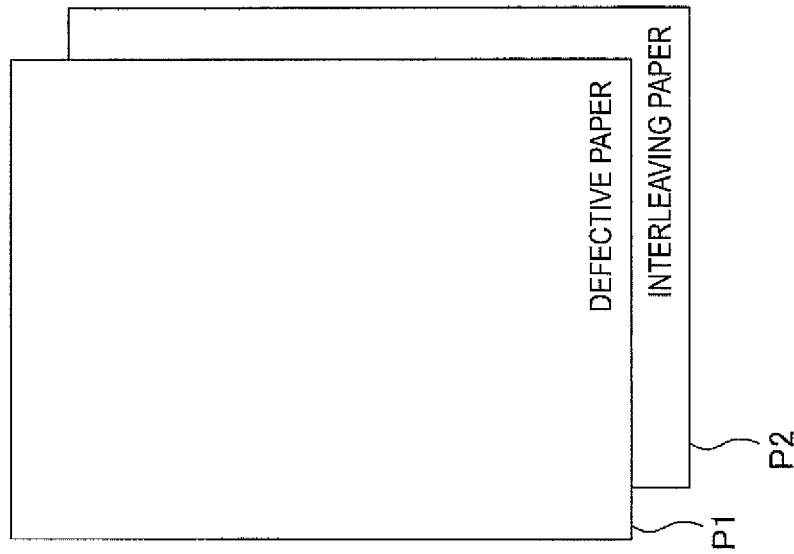
FIGS. 9A and 9B are views illustrating stacked states of the papers in a paper stacking unit, respectively.
Figure 9A:
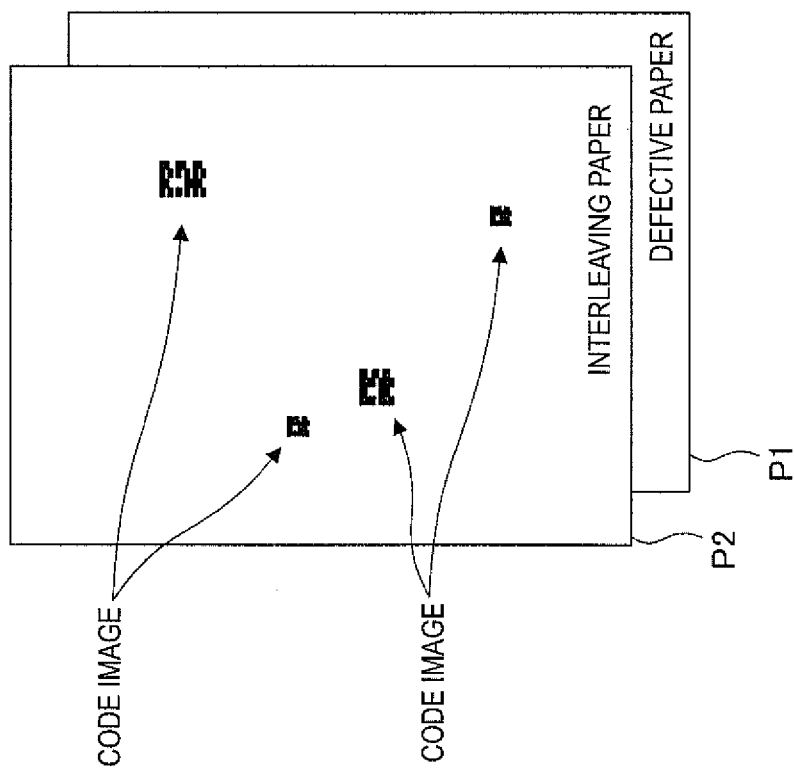

Further, FIG. 9B illustrates an example of stacking in which the interleaving paper P2 is positioned at the rear side of the defective paper P1.

Further, in the present embodiment, as described above, each of the code images formed on an interleaving paper P2 is formed based on identification information and includes the same identification information. However, without being limited to this, each of the code images may be formed to include different identification information. Also, in this case, the displaying on the monitor 211 is switched whenever reading, for example, plural code images formed on the interleaving paper P2.

In the aspect as illustrated in FIG. 4, displaying on the monitor 211 is switched by operating the switching operation unit 414 on the monitor 211. But, when each of the code images contains different identification information, the displaying on the monitor 211 is switched whenever the code image on the interleaving paper P2 is read.

Further, in the present embodiment, although a case where the code image is formed on the interleaving paper P2 using the code image forming head 215 installed in the inspection apparatus 200 is described as an example, forming of the code images onto the interleaving paper P2 may be performed by an image forming unit (not illustrated) provided in the image forming apparatus 100. Specifically, for example, the interleaving paper supplying apparatus 600 is installed in the image forming apparatus 100 and interleaving papers P2 are supplied from the interleaving paper supplying apparatus 600 to the image forming unit installed on the image forming apparatus 100, such that an image may be formed on the interleaving papers P2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image inspection system, comprising:
   a first image forming unit that forms an image on a recording material;
   an inspection unit that inspects a formed image formed on the recording material by the first image forming unit and specifies from the formed image, a portion which does not satisfy a predetermined requirement;
   a stacking unit that stacks the recording material subjected to the inspection by the inspection unit and stacks a sheet together with the recording material, the recording material and the sheet being also stacked such that the recording material on which the formed image having the portion which does not satisfy the predetermined requirement and the sheet contact with each other; and
   a second image forming unit that forms an image on the sheet,
   wherein the forming of the image onto the sheet is performed by the second image forming unit such that the image on the sheet corresponds in position to the portion on the recording material.

2. The image inspection system according to claim 1, wherein the forming of the image onto the sheet is performed by the second image forming unit such that a positional relationship of the portion on the recording material corresponds to a positional relationship of the image on the sheet.

3. The image inspection system according to claim 1, wherein the second image forming unit forms on the sheet, an image containing identification information which enables the sheet to be identified from other sheets.

4. The image inspection system according to claim 3, further comprising:
   an image reading unit that reads the formed image formed on the recording material by the first image forming unit;
   a storage unit that correlates and stores read image data of the formed image having the portion which does not satisfy the predetermined requirement and which is read by the image reading unit, original image data which becomes the basis of the formed image, and identification information which becomes the basis of the image formed on the sheet contacting with the recording material on which the formed image is formed; and
   an image display unit that displays an image based on the original image data which corresponds to the read image data stored in the storage unit and displays an image based on the read image data corresponding to the identification information obtained from the image formed on the sheet stored in the storage unit.

5. An image inspection system, comprising:
   a first image forming unit that forms an image on a recording material;
   an inspection unit that inspects a formed image formed on the recording material by the first image forming unit and acquires positional information which corresponds to information relating to a portion of the formed image, which does not satisfy a predetermined requirement;
   a stacking unit that stacks the recording material subjected to inspection by the inspection unit and to stack a sheet together with the recording material, the recording material and the sheet being also stacked such that the recording material on which the formed image having the portion which does not satisfy the predetermined requirement is formed and the sheet contact with each other; and
   a second image forming unit that forms an image on the sheet based on the positional information acquired by the inspection unit.

6. The image inspection system according to claim 5, wherein, with respect to the portion which does not satisfy the predetermined requirement, the inspection unit specifies a degree by which the portion does not satisfy the predetermined requirement, and
   when the formed image has plural portions which do not satisfy the predetermined requirement, the second image forming unit forms plural images on the sheet to correspond to the plural portions and set sizes of the images to be different depending on the degree specified by the inspection unit.

7. The image inspection system according to claim 5, wherein the forming of an image onto the sheet is performed such that the portion which does not satisfy the predetermined requirement specified by the inspection unit and the image formed on the sheet by the second image forming unit overlap when the recording material and the sheet contact with each other.

8. An image inspection apparatus, comprising:
   an inspection unit that inspects a formed image formed on a recording material and specifies from the formed image, a portion which does not satisfy a predetermined requirement;

a conveying unit that sequentially conveys the recording material subjected to inspection by the inspection unit;

a supplying unit that supplies the sheet either between the recording material on which the formed image having the portion which does not satisfy the predetermined requirement is formed and a subsequent recording material which is conveyed by the conveying unit to the recording material or between the recording material on which the formed image is formed and a preceding recording material conveyed earlier than the recording material by the conveying unit;

an image forming unit that forms an image on the sheet, wherein the forming of the image onto the sheet is performed by the image forming unit such that the image on the sheet corresponds in position to the portion on the recording material.

9. An image inspection apparatus, comprising:

an inspection unit that inspects a formed image formed on a recording material and acquires positional information which corresponds to information relating to a portion of the formed image, which does not satisfy a predetermined requirement;

a conveying unit that sequentially conveys the recording material subjected to inspection by the inspection unit;

a supplying unit that supplies the sheet either between the recording material on which the formed image having the portion which does not satisfy the predetermined requirement is formed and a subsequent recording material which is conveyed by the conveying unit to the recording material or between the recording material on which the formed image is formed and a preceding recording material conveyed earlier than the recording material by the conveying unit; and an image forming unit that forms an image on the sheet based on the positional information acquired by the inspection unit.

* * * * *